United States Patent
Langford

Patent Number: 5,871,244
Date of Patent: Feb. 16, 1999

[54] TONGS

[76] Inventor: Danny F Langford, Box 77, Spruce Home, Saskatchewan, Canada, S0J 2N0

[21] Appl. No.: 976,313

[22] Filed: Nov. 21, 1997

[30] Foreign Application Priority Data

Mar. 21, 1997 [CA] Canada .................................... 2200676

[51] Int. Cl.⁶ ..................................................... B65G 7/12
[52] U.S. Cl. .............................. 294/16; 294/28; 294/104
[58] Field of Search ................................ 294/11, 15, 16, 294/26, 28, 31.1, 62, 104, 106, 117, 118, 903

[56] References Cited

U.S. PATENT DOCUMENTS

| | | | |
|---|---|---|---|
| 1,508,340 | 9/1924 | Kroening | 294/118 |
| 1,513,023 | 10/1924 | Bartlett | 294/106 |
| 2,051,655 | 8/1936 | Smith | 294/118 X |
| 2,117,447 | 5/1938 | Paloni | 294/106 |
| 2,247,780 | 7/1941 | Klammt | 294/118 |
| 2,360,770 | 10/1944 | Goodwin | 294/28 |
| 2,531,987 | 11/1950 | Pilliod | 294/118 |
| 2,622,917 | 12/1952 | Underwood et al. | 294/118 |
| 2,961,683 | 11/1960 | Meyer | 294/118 X |

FOREIGN PATENT DOCUMENTS 160403  1/1955  Australia .................................. 294/16

*Primary Examiner*—Johnny D. Cherry
*Attorney, Agent, or Firm*—Murray E. Thrift; Adrian D. Battison

[57] ABSTRACT

A set of carrying tongs is intended for one hand operations. It includes a main member with a handle at one end arranged at an acute angle to a center part of the main member. A gripping part at the opposite end is arranged at an obtuse angle to the main arm. A tip projects from the end of the gripping part. The second arm of the tongs is pivotally connected to the main arm between its ends. It has a gripping part arranged at an obtuse angle and a tip projecting from the end of the gripping parts. The tongs may be used single handed to grip and carry a number of different objects of various sizes and shapes. An eye at the juncture between the handle and the main arm can be connected to a rope or cable for hauling on the tongs.

6 Claims, 2 Drawing Sheets

TONGS

FIELD OF THE INVENTION

The present invention relates to carrying tongs.

BACKGROUND

The invention is concerned with a multi-purpose set of tongs that has numerous uses in gripping and carrying various different types of objects. The tongs can be used for carrying square or rectangular blocks, for example salt blocks. They can also be used for lifting round objects, for example, lengths of firewood. They can be used for dragging logs. Other applications of the tongs include use as a meat hook and as a coupling for connecting a towing rope to a vehicle. In an agricultural setting, they can be used for carrying square bales of hay or other material, preferably using two pairs of the tongs. They have proven effective in carrying automotive type batteries, wheel rims and pneumatic tires. Another application is lifting pails without handles. There are numerous applications for the tongs that will become apparent from the following discussion.

SUMMARY

According to one aspect of the invention there is provided carrying tongs comprising:

a main member including:

an elongate centre part with proximal and distal ends;

a handle extending from the proximal end of the centre part, at an acute angle to the centre part;

a first gripping part extending from the distal end of the centre part with an obtuse included angle between the centre part and the first gripping part, the first gripping part and the handle extending to opposite sides of the centre part;

pivot means mounted on the centre part between the proximal and distal ends thereof;

a secondary member including:

an elongate arm with proximal and distal ends, the proximal end being coupled to the pivot means for free pivotal movement about an axis substantially perpendicular to the centre part of the main member;

a second gripping part extending from the distal end of the arm, with an obtuse included angle between the arm and the second gripping part, the centre part, handle, first gripping part, arm and second gripping part being generally co-planar with the included angles between the centre part and the first gripping part of the main member and between the arm and the second gripping part confronting one another.

This tong configuration provides good balance of the load on the handle. It provides easy single handed operation, both for gripping and releasing an object.

The tongs are preferably equipped with pointed tips at the ends of the gripping parts that are directed towards one another for engaging objects to be carried, pulled or the like. In preferred embodiments of the invention, an eye is mounted in the angle between the centre part and the handle of the main member so that a rope can be connected to the tongs for pulling purposes.

BRIEF DESCRIPTION OF THE DRAWINGS

In the accompanying drawings which illustrate an exemplary embodiment of the present invention.

DETAILED DESCRIPTION

Figure 1:
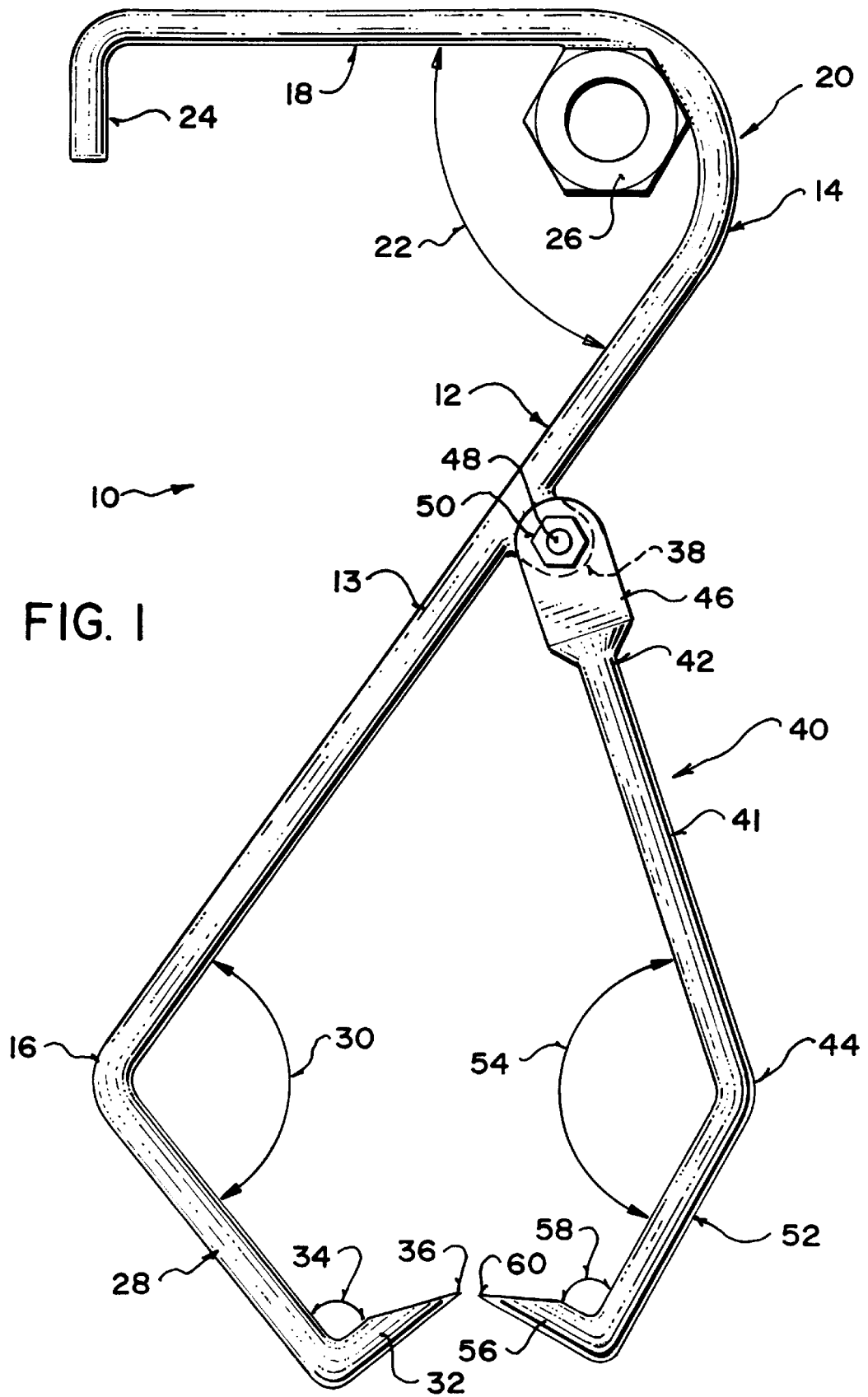
FIG. 1 is a side view of a pair of tongs according to the present invention.
Figure 2:
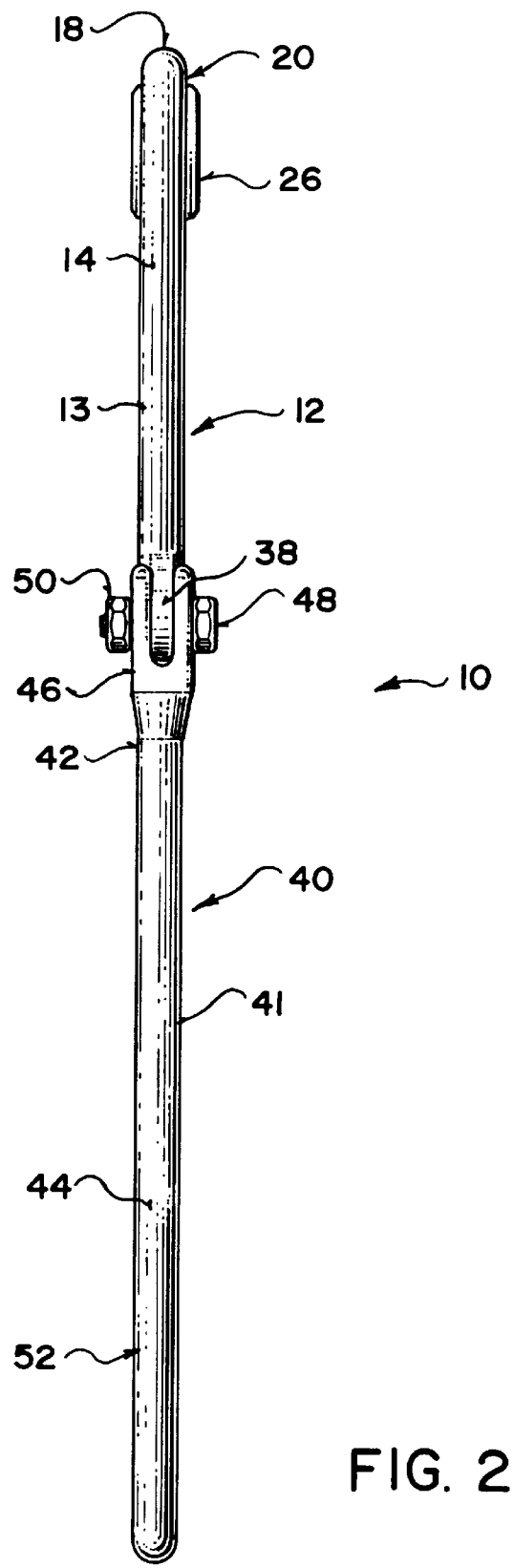
FIG. 2 is an end view of the tongs.

Referring to the accompanying drawings, there is illustrated a set of tongs 10. The tongs include a main member 12 having a centre part 13 with a proximal end 14 and a distal end 16. A handle 18 extends from the proximal end of the centre part and is joined to it by a curved segment 20 of the main member. The included angle 22 between the handle and the centre part is acute. At the opposite, distal end of the handle from the curved segment 20 is an end section 24 that projects from the handle end at a right angle to the main extent of the handle, and towards the centre part 13. An eye 26 is mounted at the distal end of the centre part 12.

At the distal end of the centre part is a gripping part 28 that projects to a side of the centre part opposite the handle 18. The included angle 30 between the gripping part and the centre part is an obtuse angle. At the end of the gripping part 28 is a tip 32 that projects from the gripping part at a right angle 34. The included angle 34 confronts the centre part 13. The tip has a pointed end 36.

Part way along the centre part, on the side to which the gripping part projects is a lug 38.

A secondary member 40 has a straight, elongate arm 41 with a proximal end 42 and a distal end 44. A clevis 46 at the proximal end 42 is coupled to the lug 38 on the main member 12 by a pivot bolt 48 and a nut 50. The axis of the pivot bolt is generally perpendicular to the plane containing the centre part 13, handle 18, gripping part 28 and tip 32 of the main member.

A second gripping part 52 extends from the distal end of the arm 41. The included angle 54 between the arm and the second gripping part is obtuse and confronts the angle 30 between the centre part and the first gripping part 28 of the main member. At the distal end of the second gripping part is a tip 56. The included angle 58 between the tip and the second gripping part is an acute angle that confronts the pivot bolt 48. The end of the tip 56 is formed into a point 60.

The arm 41, second gripping part 52 and the tip 56 of the secondary member 40 lie generally in the same plane as the centre part 13, handle 18, first gripping part 28 and tip 32 of the main member.

In the use of the tongs, an object is positioned between the gripping parts 28 and 52 to be engaged by the tips 32 and 56. As noted above, the object might be of various sizes. In any event, with the handle held horizontally, a vertical line through the longitudinal centre of the handle passes through the gripping part tip 32, adjacent its point 36 so that the centre of any object gripped with be closer to the distal end of the centre part than the centre of the handle. This will tend to rotate the tongs to a position where the handle slopes upwardly from the distal end of the centre part. A manual force applied on the handle countering this rotation provides a firm engagement between the object and the main member 12. The secondary member then acts as a retainer to retain this engagement and prevent the object from falling out of engagement with the tongs. To release the object, the tongs are tilted forward allowing the weight to fall on the secondary member 40 so that the objects can fall freely from the tongs. The tongs can thus be used with a single hand and they serve a number of different purposes.

In applications where the tongs are to be pulled with a cable or other rope, the cable is connected to the eye, which lies generally on a line through the pivot 48 and the point 36 of tip 32, providing a balanced action on the two tong arms. To engage small objects, the two gripping parts and their tips may be overlapped so that the two included angles 34 and 58 coincide for capturing an object to be engaged. This may, for example, be a ball hitch for a trailer that would then be captive between the tips and the gripping parts.

While one embodiment of the present invention has been described in the foregoing, it is to be understood that other embodiments are possible within the scope of the invention and are intended to be included herein. The invention is to be considered limited solely by the scope of the appended claims.

I claim:

1. Carrying tongs comprising:
   a main member consisting of one metal bar and including:
      an elongate center part with proximal and distal ends;
      a handle extending from the proximal end of the center part, at an acute angle to the center part; and
      a first gripping part extending from the distal end of the center part with an obtuse included angle between the center part and the first gripping part, the first gripping part and the handle extending to opposite sides of the center part;
   pivot means mounted on the center part of the main member between the proximal and distal ends thereof; and
   a secondary member consisting of one metal bar and including:
      an elongate arm with proximal and distal ends, the proximal end being coupled to the pivot means for free pivotal movement about an axis substantially perpendicular to the center part of the main member;
      a second gripping part extending from the distal end of the arm, with an obtuse included angle between the arm and the second gripping part; the center part, handle, first gripping part, arm and second gripping part being generally co-planar with the included angles between the center part and the first gripping part of the main member and between the arm and the second gripping part confronting one another, wherein the proximal end of the elongate arm of the secondary member is a free end connected solely to the pivot means and the main and secondary members are connected solely by the pivot means.

2. Carrying tongs according to claim 1 wherein the main member includes a tip extending from an end of the first gripping part remote from the distal end of the center part and at an angle to the first gripping part, and the secondary member includes a tip extending from an end of the second gripping part remote from the distal end of the elongate arm and at an angle with the second gripping part, the tips confronting the pivot means, the tips being generally co-planar with the center part, handle, first griping part, arm and second gripping part.

3. Carrying tongs according to claim 2 including an eye at the proximal end of the center part of the main member, where the handle and the center part meet.

4. Carrying tongs according to claim 2 wherein the angle between the tip extending from the first gripping part and the first gripping part is a right angle.

5. Carrying tongs according to claim 4 wherein the angle between the tip extending from the second gripping part and the second gripping part is an acute angle.

6. Carrying tongs according to claim 1 including an eye at the proximal end of the center part of the main member, where the handle and the center part meet.

* * * * *